(12) United States Patent
Yeh

(10) Patent No.: US 7,665,855 B2
(45) Date of Patent: Feb. 23, 2010

(54) ROTATING WINDOW

(76) Inventor: Tzu-Yuan Yeh, 13F., No. 963, Jhongjheng Rd., Jhonghe City, Taipei County 235 (TW)

( * ) Notice: Subject to any disclaimer, the term of this patent is extended or adjusted under 35 U.S.C. 154(b) by 0 days.

(21) Appl. No.: 11/713,807

(22) Filed: Mar. 5, 2007

(65) Prior Publication Data
US 2008/0218859 A1 Sep. 11, 2008

(51) Int. Cl.
*G02B 5/00* (2006.01)
(52) U.S. Cl. .................................. 359/508; 359/894
(58) Field of Classification Search ................ 359/508, 359/894; 49/171; 52/171.1
See application file for complete search history.

(56) References Cited

U.S. PATENT DOCUMENTS

| | | | | |
|---|---|---|---|---|
| 1,319,516 | A * | 10/1919 | Drew | 296/96.16 |
| 3,103,712 | A * | 9/1963 | Allinikov et al. | 52/171.1 |
| 3,347,004 | A * | 10/1967 | Allen | 52/171.2 |
| 3,495,366 | A * | 2/1970 | Allen | 52/171.2 |
| 3,688,081 | A * | 8/1972 | Speich | 219/203 |
| 4,536,064 | A * | 8/1985 | Schindel et al. | 359/508 |
| 5,161,055 | A * | 11/1992 | Blechschmidt | 359/508 |
| 5,927,010 | A * | 7/1999 | Blechschmidt | 49/21 |
| 7,145,145 | B2 * | 12/2006 | Benson | 250/339.07 |

* cited by examiner

*Primary Examiner*—Ricky D Shafer
(74) *Attorney, Agent, or Firm*—Jackson IPG PLLC

(57) ABSTRACT

A rotating window includes a circular base member, a transparent window, and a magneto-conductive element, which are assembled into an electric motor device. By this rotating window, area of transparent region of the transparent window is increased, an outer diameter of a central shaft hole is decreased, and a support bracket is designed as an I-shape or a half I-shape, thereby largely decreasing barriers to the transparent window, allowing a user to conveniently see through scenery or objects at one side of the transparent window without a dead angle. In case that the rotating window is hit by objects and rotates eccentrically, an air gap of the motor disappears, and an entire frame of the rotating window will be absorbed magnetically to the magneto-conductive element, thereby improving safety to people and objects.

14 Claims, 8 Drawing Sheets

ROTATING WINDOW

BACKGROUND OF THE INVENTION a) Field of the Invention

The present invention relates to a rotating window, and more particularly to a rotating window which is installed on a transparent glass of a CNC (Computer Numerically Controlled) machine tool or a transparent window of a ship.

b) Description of the Prior Art

A typical structure of a conventional rotating window has been disclosed in U.S. Pat. No. 5,161,055, wherein the rotating motor is located exactly at the center of the rotating glass (or transparent material), and a non-transparent housing member is fixed at the inner side of the rotating glass. The patent is provided with the following shortcomings after long time of usage:

(1) As the motor and the driving circuit take about one-fifth to one-sixth of the entire viewable area of the rotating window; therefore, when an operator needs to inspect by eyes a working status inside the CNC machine tool from the rotating glass, he or she will be usually blocked by the housing member to cause a bad vision, thereby being unavailable to completely observe the finishing status inside the CNC machine tool.

(2) The circular rotating glass rotates along with the central motor. However, if a working object inside the CNC machine tool slings off and hits on the rotating glass, the entire rotating glass will be ruptured and the frame which fixes the glass will be thrown out, thereby being capable of hurting people.

(3) As the motor is located exactly at the center of the rotating glass, it takes on extremely large circular area, and even occupies the transparent part of the rotating glass, as well as blocks the line of vision.

Accordingly, how to provide a broader angle of vision for the rotating window, and to improve work safety, is a technical issue to be pursued by the present invention.

SUMMARY OF THE INVENTION

The primary object of present invention is to provide a rotating window which is provided with broader transparent area, such that blockages to viewing the rotating window will be lesser, thereby allowing an operator to more clearly see objects or scenery at an exterior of one side of the rotating window.

Another object of the present invention is to provide a rotating window such that in case that the rotating window is damaged, an air gap between a magnet ring and a magneto-conductive element will disappear, enabling an entire frame to be absorbed magnetically to an inner wall of the magneto-conductive element, without being thrown out, thereby improving safety to people and objects.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
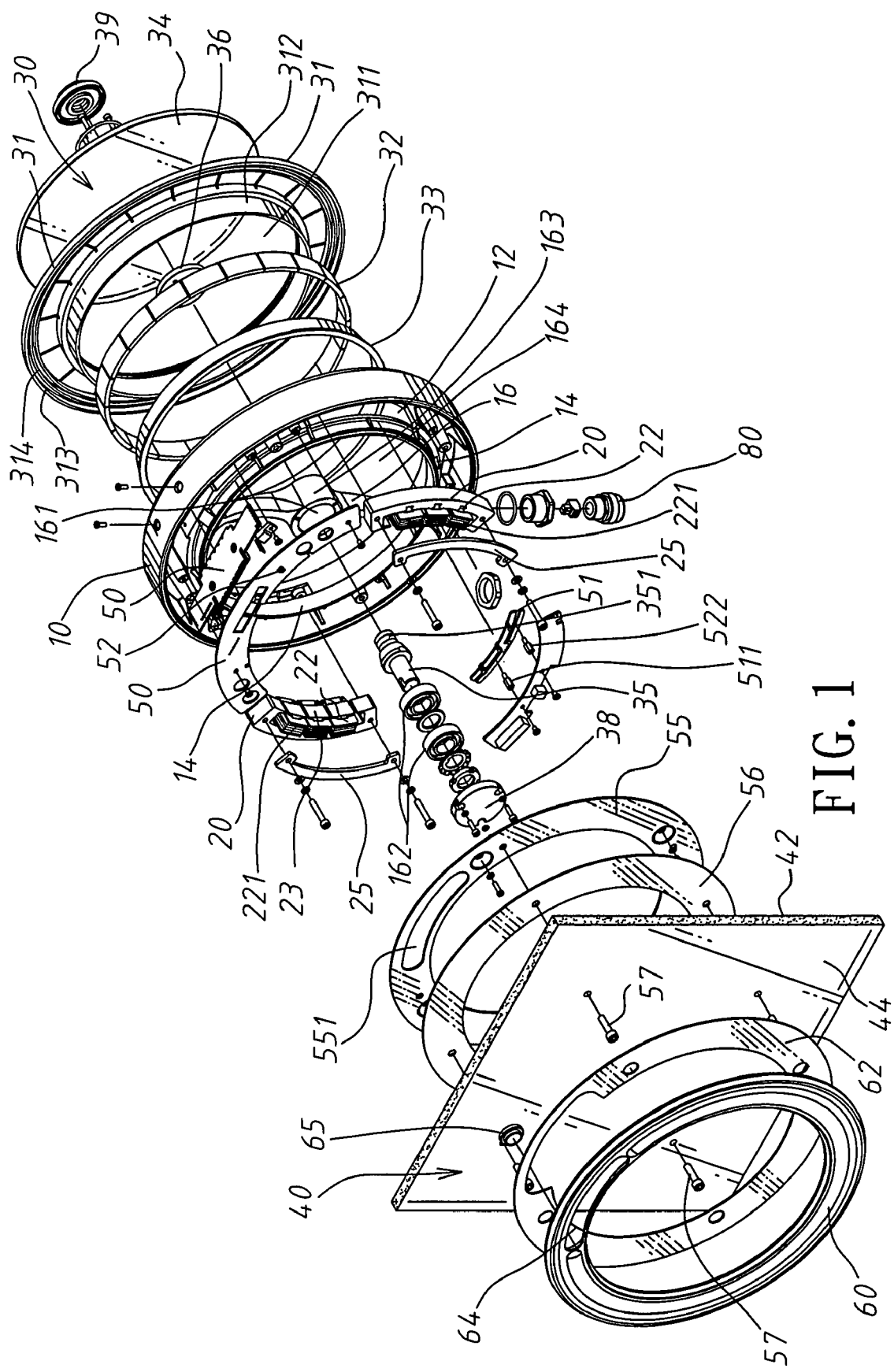
FIG. 1 shows an exploded view of parts of the present invention.
Figure 5:
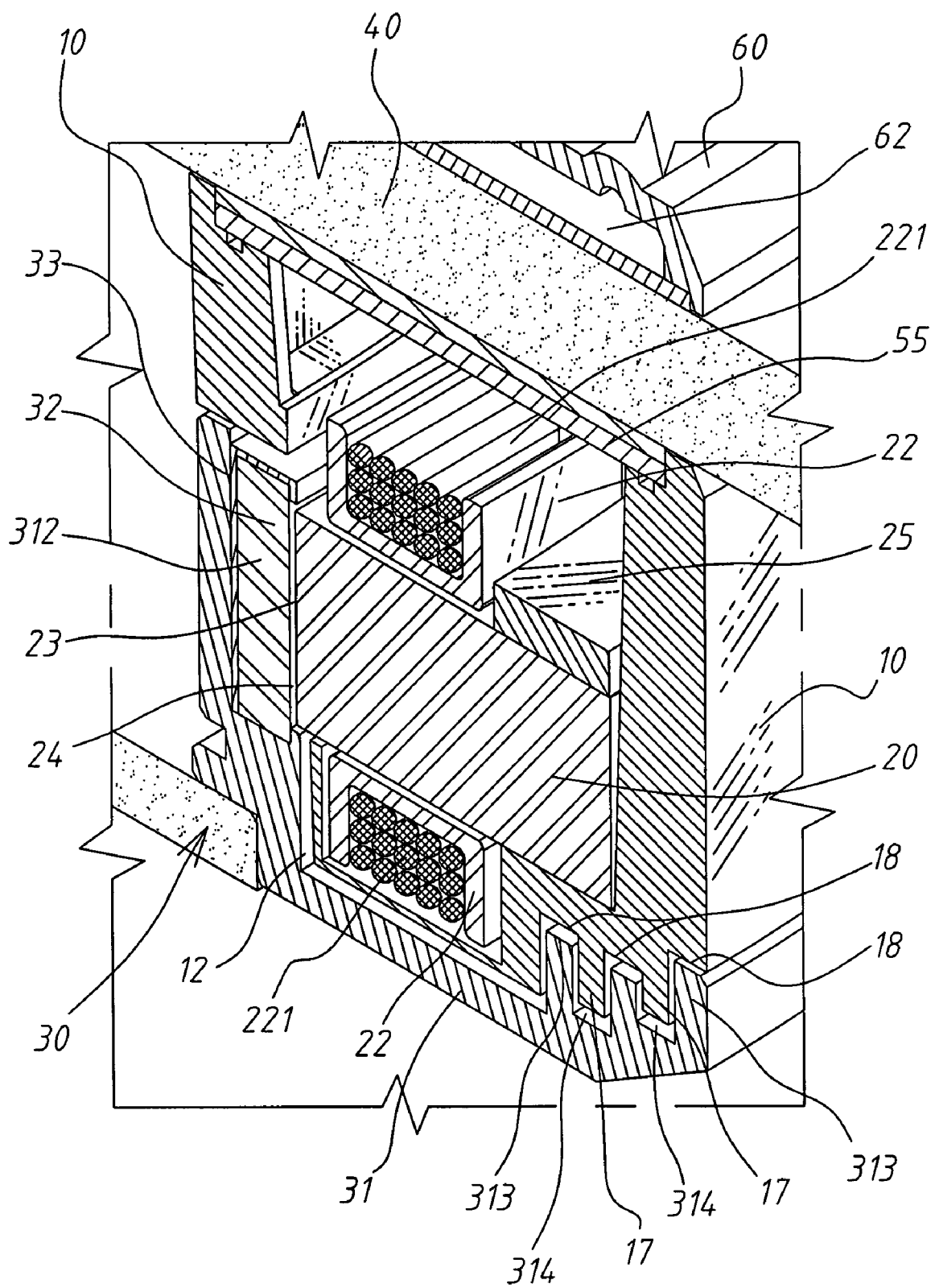
FIG. 5 shows a local cross-sectional blow-up view of the present invention.

Referring to FIG. 1, the present invention is to provide a rotating window 30, including a base member 10 which is provided with a circular groove 12, between inner walls 14 of which is connected with a support bracket 16 having a central sleeve 163 with a shaft hole 161, and with an exterior side of the support bracket 16 being a hollow area 164; and coil seats 22, which are wound by a plurality of metallic coils 221, and are fixedly connected in an interior of a magneto-conductive element 20, with the magneto-conductive element 20 being fixedly connected into the circular groove 12. The rotating window 30 is loosely connected into the circular groove 12 to form a motor rotor, and is constituted by the following parts:

(a) A turntable 31, a center of which is provided with a through-hole 311, and an inner side of which is provided with a flange 312, with a transparent window 34 being fixed into the through-hole 311 for sealing the through-hole 311;

(b) A back iron 33 which is made by a magneto-conductive material and is sheathed and fixed at a side of a permanent magnet ring 32, with the magnet ring 32 and the back iron 33 being sheathed together and fixed on a surface of the flange 312, and then sheathed at an inner side of the base member 10, thus further forming an air gap 24 between the magnet ring 32 and an inner wall 23 of the magneto-conductive element 20 (as shown in FIG. 5); and (c) A spindle 35, which is connected loosely into the shaft hole 161, with a shaft end 351 being fixed in a center of the rotating window 30.

The base member 10 is fixed on an inner surface 42 of a static transparent board 40. The magneto-conductive element 20 forms a motor stator to result in an electro-magnetic field to drive the magnet ring 32 to rotate, and the rotating window 30 will rotate along with the magnet ring 32 simultaneously, to sling off any liquid or debris which sprays on a surface of the transparent window 34.

Figure 2:
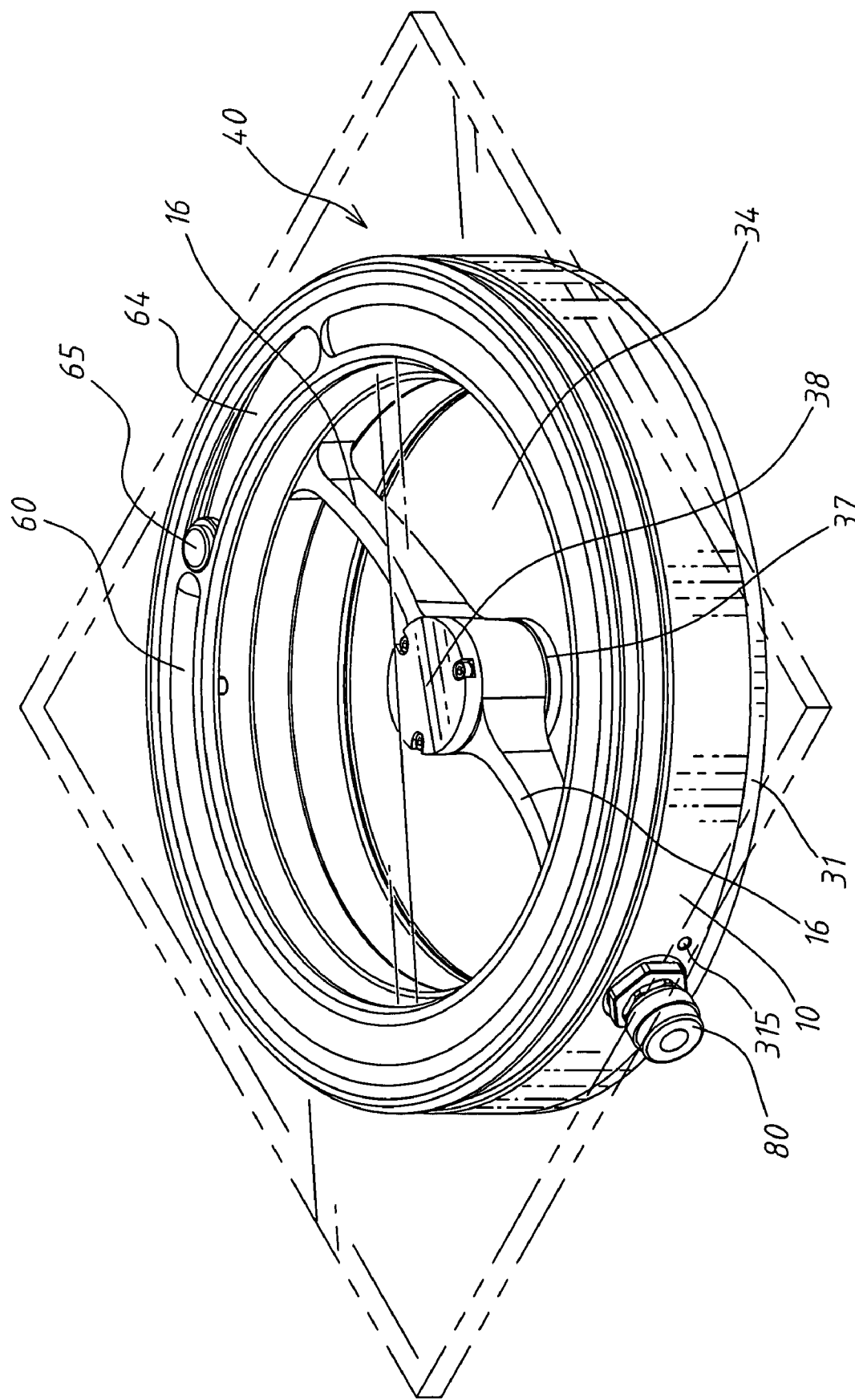
FIG. 2 shows a perspective view of the present invention which is assembled.

Referring to FIG. 1 and FIG. 2, the base member 10, the rotating window 30, and the magneto-conductive element 20 are assembled into an electric motor device.

Figure 4:
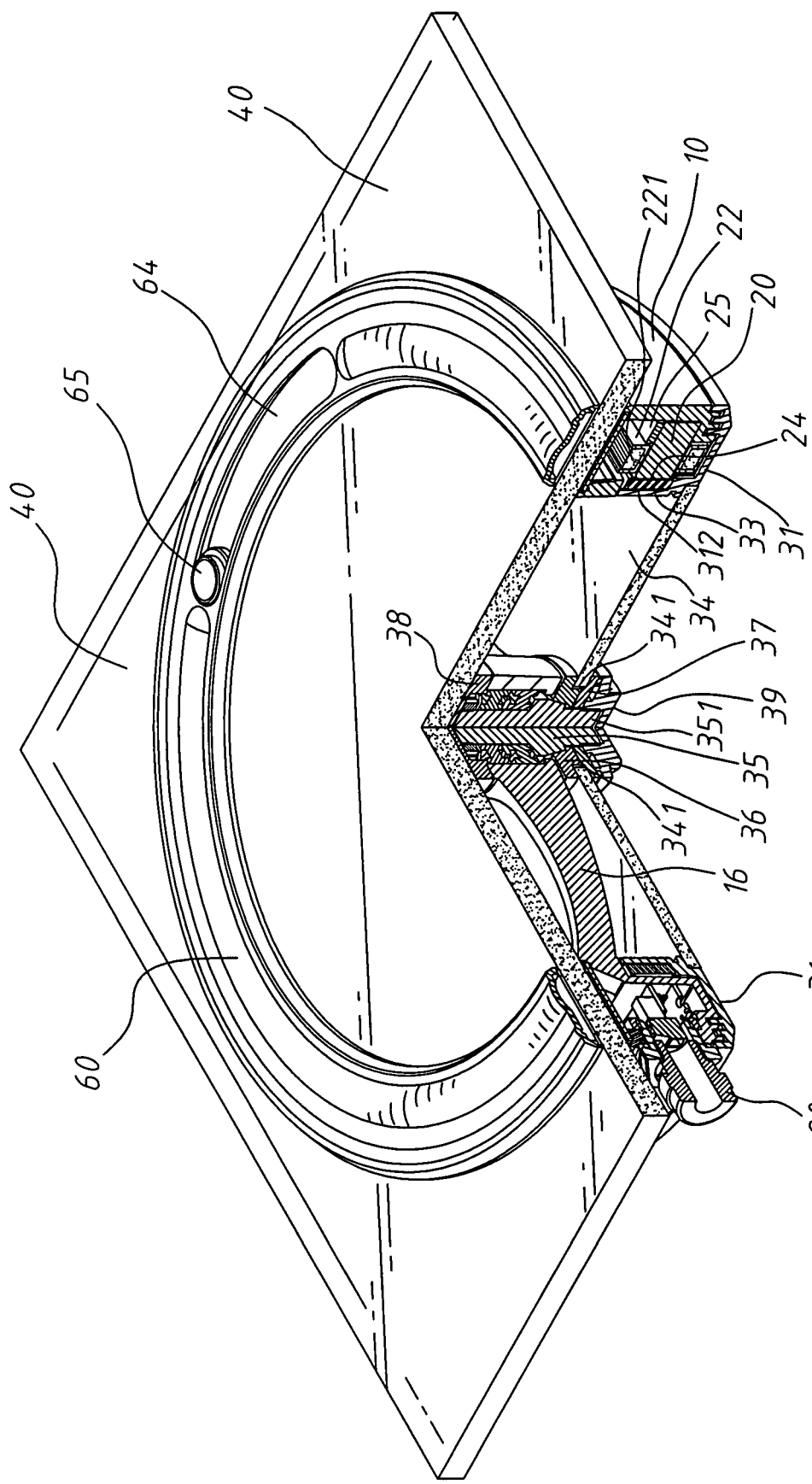
FIG. 4 shows a local cross-sectional view of the present invention.
Figure 6:
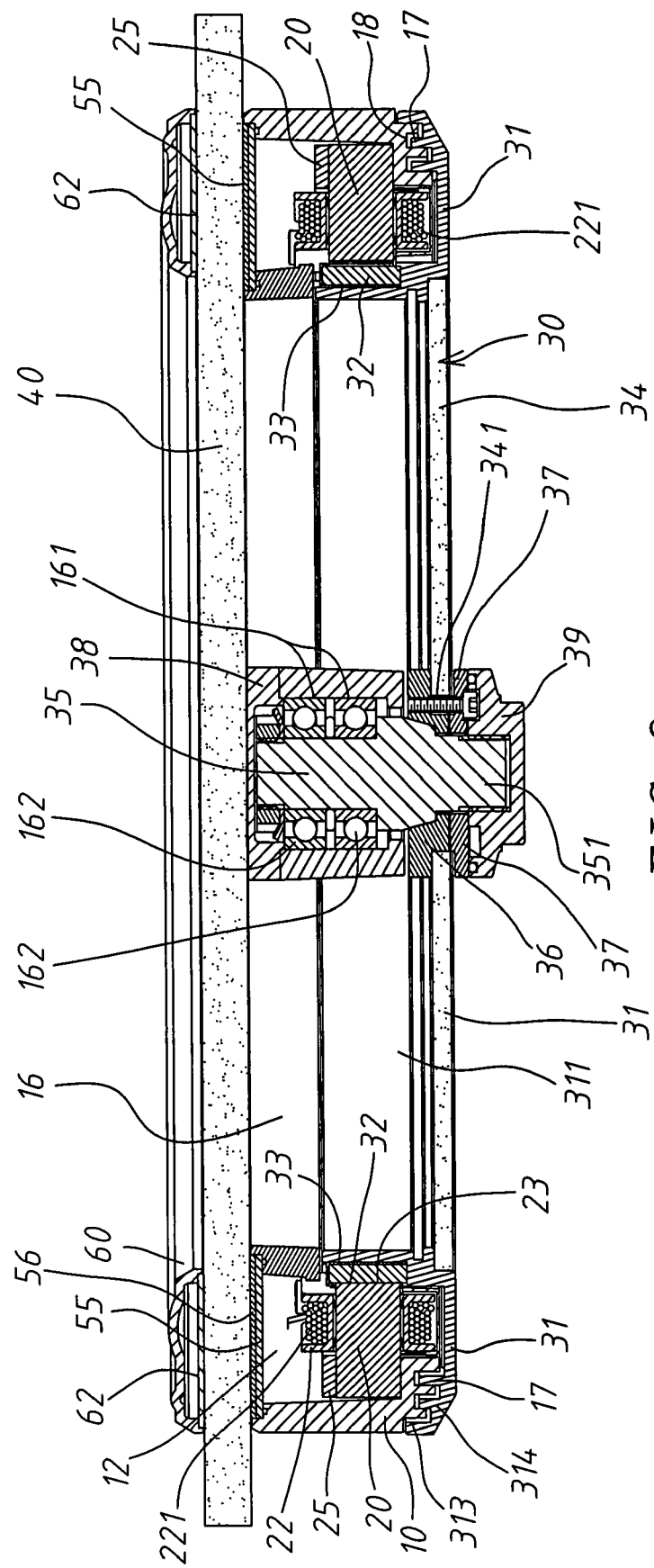
FIG. 6 shows a transversal cross-sectional view of the present invention.

Referring to FIG. 4 and FIG. 6, the shaft end 351 is sheathed into an inner gasket 36, such that the inner gasket 36 and the shaft end 351 are tightly fitted. The center of transparent window 34 is provided with a through-hole 341, and the inner gasket 36 is fitted into the through-hole 341 to be tightly affixed on a surface at a rim of the through-hole 341. An outer gasket 37 is transfixed into the shaft end 351 and tightly affixed on an outer surface of the through-hole 341; whereas, the inner gasket 36 and the outer gasket 37 are screwed together. An outer cap 39 is screwed into the shaft end 351 to cover the outer gasket 37, and the transparent window 34 is clipped and fixed by the inner gasket 36 and the outer gasket 37.

The shaft hole 161 is fixed with a bearing 162 and the spindle 35 is fixed into a shaft hole of the bearing 162 (as shown in FIG. 1 and FIG. 6).

Referring to FIG. 1, two pieces of circuit boards 50 are fixed respectively into the circular groove 12, wherein a board surface of one arc-shape circuit board 50 is protruded with a sensor switch 52, and a covering element 55 is provided with an arc-shape groove 551 and is fixed on the base member 10 to seal a side of the circular groove 12, with the sensor switch 52 being exposed in the arc-shape groove 551.

Figure 3:
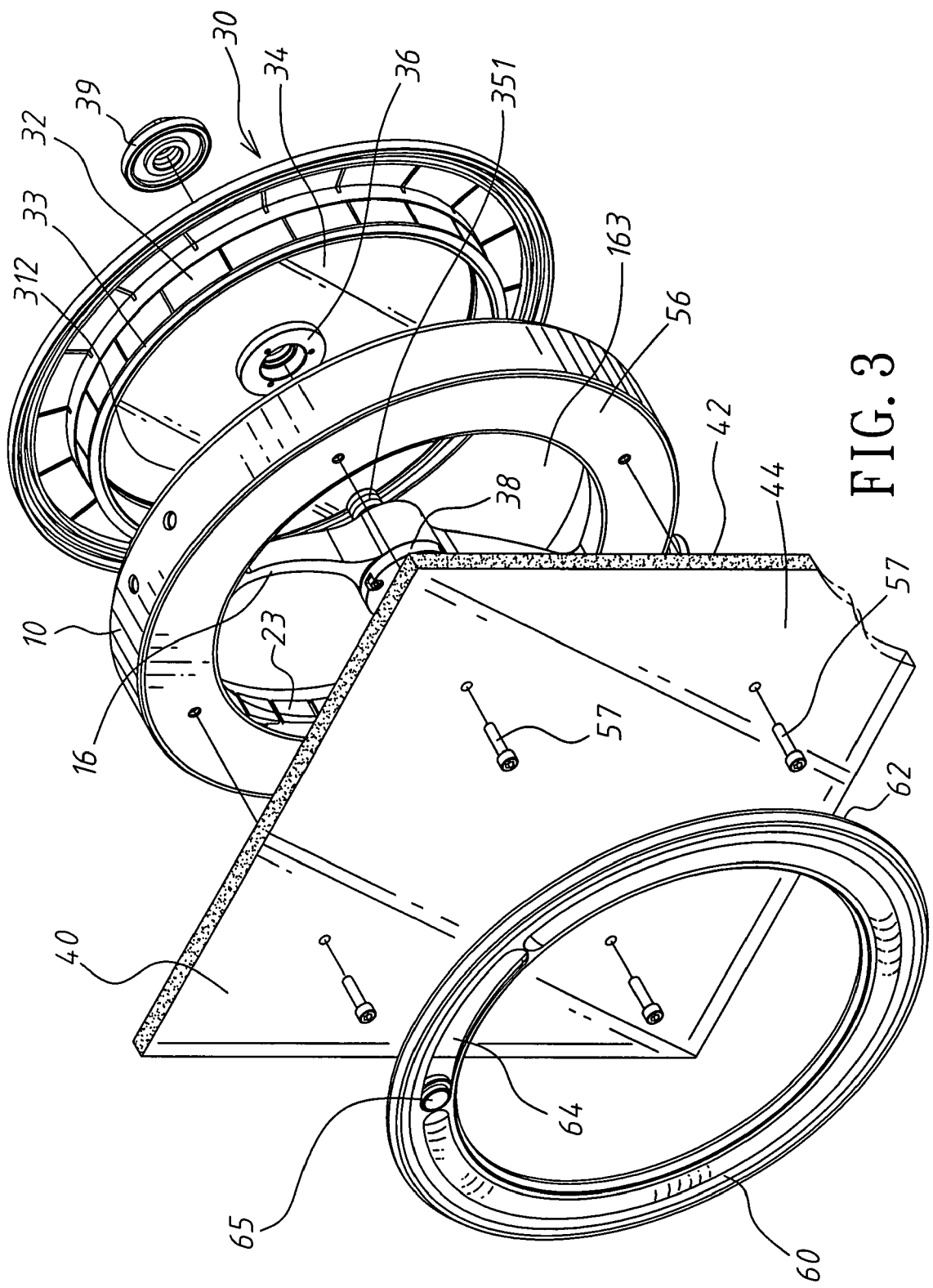
FIG. 3 shows another exploded view of parts of the present invention.

Referring to FIG. 3, the base member 10 can be screwed and fixed on the inner surface 42 of the static transparent board 40. Corresponding to an outer surface 44 of the transparent board 40, an adhesive disc 62 (as shown in FIG. 1) is attached and fixed on an outer cap 60, a center of which is formed with an arc-shape groove 64 to correspond with the arc-shape groove 551 of the covering element 55. A magnetic block 65 is loosely connected and locked into the arc-shape groove 64, and can be dislocated in the arc-shape groove 64 upon being sustained with force. When the magnetic block 65 approaches to the sensor switch 52, the sensor switch 52 will be in a close-circuit (on) state to actuate driving circuits of the circuit boards 50. On the other hand, when the magnet block 65 leaves the sensor switch 52, the sensor switch 52 will be in an open-circuit (off) state to shut off the driving circuits of the circuit boards 50.

Referring to FIG. 1 and FIG. 5, the magneto-conductive element 20 is made by a silicon-steel piece to form an arc-shape body. An outer surface of the magneto-conductive element 20 is screwed and fixed with a gasket 25 to stably fix the coil seats 22 on the magneto-conductive element 20.

Figure 7:
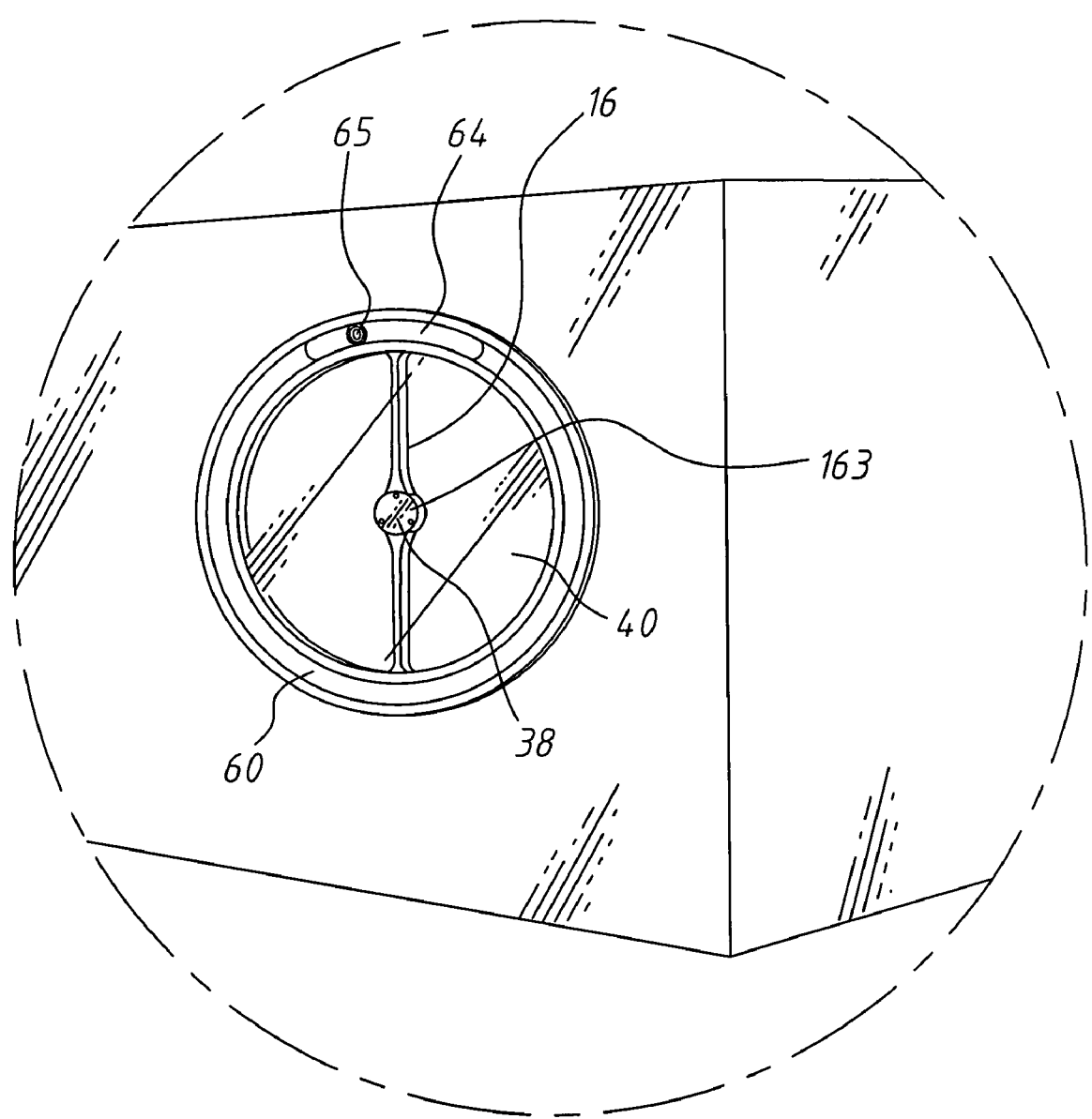
FIG. 7 shows a perspective view of the present invention being implemented to a machine tool.

The support bracket 16 is arranged as a letter of I, and can be aligned longitudinally or transversally (as shown in FIG. 7).

Figure 8:
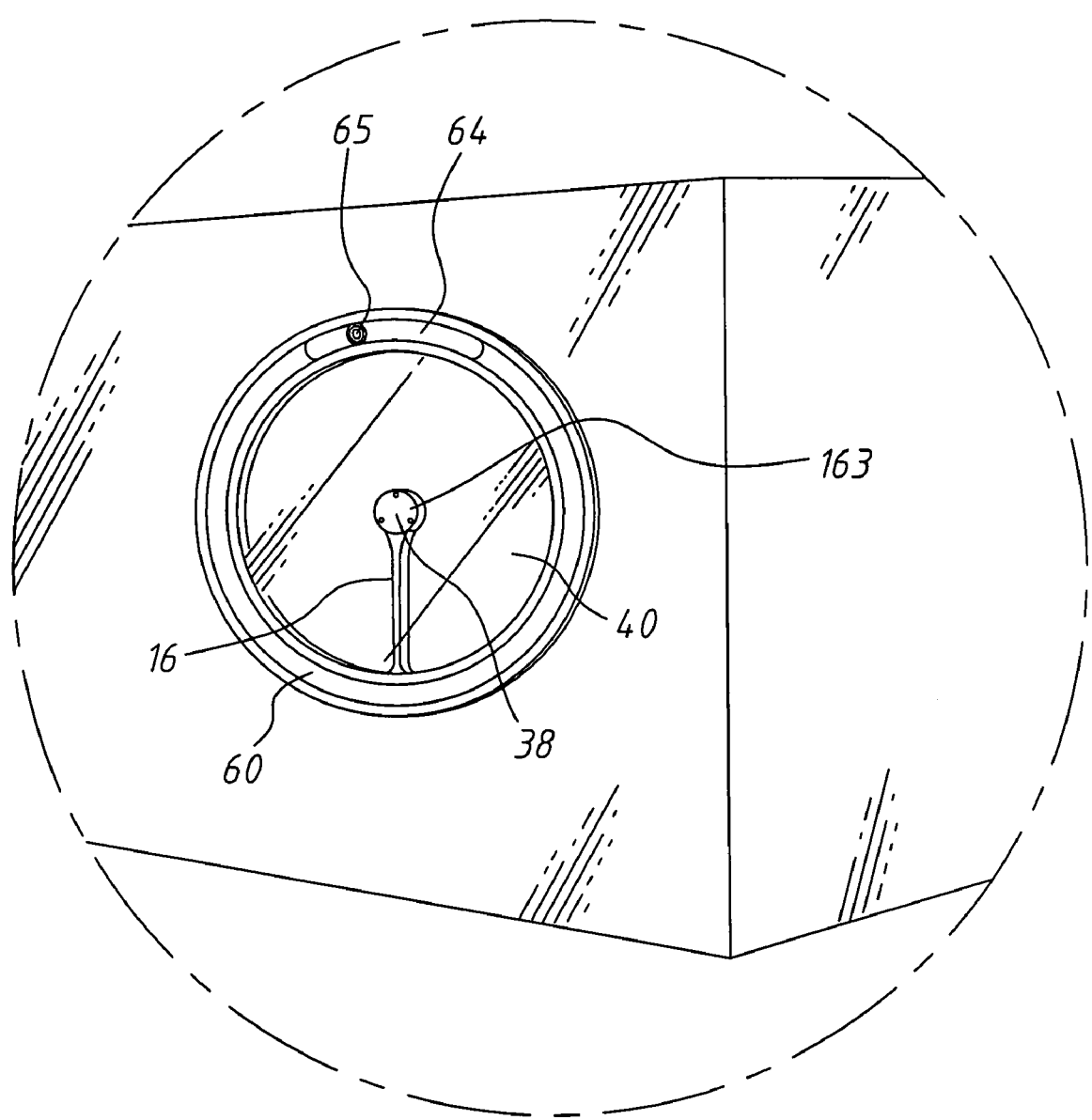
FIG. 8 shows another perspective view of the present invention being implemented to a machine tool.

In addition, the support bracket 16 can be extended and connected to the sleeve 163 only, to form a non-continuous state (as shown in FIG. 8).

Referring to FIG. 4 and FIG. 5, loosely-connected ends at sides of the base member 10 are provided respectively with projected rings 17 and concaved rings 18, loosely-connected ends at outer sides of the turntable 31 are provided respectively with projected rings 313 and concaved rings 314, the projected rings 313 are correspondingly fitted into the concaved rings 18 of the base member 10, and the concaved rings 314 are, correspondingly fitted with the projected rings 17 of the base member 10, so as to form a maze design to prevent from water leakage.

If the rotating window 30 rotates eccentrically, the local air gap 24 will disappear, and the magnet ring 32 will be absorbed magnetically to the inner wall 23 of the magneto-conductive element 20, thereby stopping the rotating window 30.

An outer connection end of the shaft hole 161 is fixedly connected with a sealing cap 38 to seal the shaft hole 161 (as shown in FIG. 4 and FIG. 6).

A connection end of the base member 10 is connected with a connection seat 80 for connecting with an external connector and wires (not shown in the drawings).

Referring to FIG. 1, a side of the circular groove 12 of the base member 10 is sealed by the covering element 55, an adhesive disc 56 is then affixed onto the covering element 55, and a set of bolts 57 are screwed into preset screw-holes of the static transparent board 40, the adhesive disc 56, the covering element 55, and the base member 10, such that the base member 10 can be fixed on the inner surface 42 of the static transparent board 40.

Referring to FIG. 1, the connection seat 80 is a terminal socket of an electric wire to provide for insertion of a wire terminal (not shown in the drawing), such that power can be provided to the circuit boards 50. Although other controlling circuit boards are also installed in the circular groove 12, they are not the features to be pursued by the present invention. Therefore, further description is not necessary. However, the sensor switch 52 is located on one circuit board 50, and is exposed in the circular groove 551, the outer cap 60 is fixed on the outer surface 44, and the magnet block 65 is loosely connected into the arc-shape groove 64 and is driven to be dislocated in the arc-shape groove 64 by a human finger. When the magnet block 65 is dislocated to close to the sensor switch 52, the sensor switch 52 will be inducted to activate (on) by being subjected to a magnetic effect, to actuate a motor driving circuit on the circuit board 50, and the coils 221 will result in an electro-magnetic effect, thereby further enabling the magneto-conductive element 20, which is constituted by the silicon-steel material, to create a magnetic field, so as to form a motor stator wherein the continuously alternating electro-magnetic filed between N-pole and S-pole is formed on the inner wall 23 of the magneto-conductive element 20. Referring to FIG. 5, the electro-magnetic field is formed in the air gap 24 to induct the magnet ring 32 to rotate. As the magnet ring 32 and the back iron 33 are fixed on the flange 312, the turntable 31 and the transparent window 34 also rotate along with the magnet ring 32 simultaneously. At this time, the center of the transparent window 34 is fixed on the spindle 35, and hence, the spindle 35 also rotates simultaneously. In other words, the transparent window 34 rotates using the spindle 35 as a center of rotation. In addition, by the maze design of the concaved rings 18, 314 and the projected rings 17, 313, when the turntable 31 drives the projected rings 313 and the concaved rings 314 to rotate simultaneously, its centrifugal force will sling off liquid that it contacts. Although there is a little amount of liquid which is drained back into the concaved rings 314, the liquid will be dripped out from a drain hole 315 as shown in FIG. 2. However, if a cutting tool of a CNC machine tool or an object to be finished in an inner space of the static transparent board 40 is thrown out accidentally to hit on the transparent window 34, the transparent window 34 will be ruptured and will thus rotate eccentrically. When the transparent window 34 rotates eccentrically, the local air gap 24 will disappear, the magnet ring 32 will be absorbed magnetically to the inner wall 23, and the entire rotating window 30 will be in a stationary state. This effect can prevent the rotating window 30 from being thrown or flown out of the static transparent board 40, thereby avoiding hurting people or objects outside the static transparent board 40.

Referring to FIG. 1 and FIG. 3, the rotating window 30 forms the motor rotor, and the base member 10 and the magneto-conductive element 20 form the motor stator, so as to assemble into a motor device.

This design is provided with the following effects:
(a) An outer diameter of the shaft hole 161 can be largely decreased. The shaft hole 161 does not need to be installed with a small independent motor; it is only used for installing the bearing 162 and the spindle 35. Therefore, the outer diameter of the sleeve 163 of shaft hole 161 can be designed to be smaller, thereby greatly decreasing a dead angle barrier to viewing the rotating window 30, allowing personnel to have a wider angle to observe objects in the inner space of the static transparent board 40.

(b) Referring to FIG. 7, the sleeve 163 is only connected with the I-shape support bracket 16. This strip design can largely decrease a barrier to the line of sight for the personnel, allowing the blockages to the line of sight to be decreased to a minimum upon observing the objects in the inner space of the static transparent board 40. The support bracket 16 of present invention can be also a non-continuous design (as shown in FIG. 8), such that the blockages to the line of sight can be even smaller and viewing area can be even wider.

Referring to FIG. 1, the adhesive disc 56 can be also a double-sided adhesive disc, which can be affixed or screwed on the inner surface 42 of the static transparent board 40. The other gasket 25 is fixed on the surface of the magneto-conductive element 20, to stably fix the coil seats 22 on the magneto-conductive element 20.

When the human finger drives the magnetic block 65 to move reversely in the arc-shape groove 64, the magnetic induction of the magnetic block 65 and the sensor switch 52 will disappear, in order to shut off the motor driving circuit of the circuit board 50, thereby stopping the rotating window 30.

Referring to FIG. 1, it is worthy to mention further that a magnetic-pole transducer 51 (Hall sensor) is provided with two sensors 511, 522 which are used to detect positions of magnetic poles (S/N) of the magnet ring 32. After detecting the polarity of the magnetic pole (S/N), they are used to control a working current to conduct the magneto-conductive element 20 at a proper time sequence, so as to allow the inner wall 23 of the magneto-conductive element 20 to move attractively or repulsively with respect to the magnet ring 32, thereby rotating the magnet ring 32.

Referring to FIG. 8, the I-shape support bracket 16 can be designed as a non-continuous style, such that the blockages to the line of sight can be even lesser to improve a wide-angle of the light of sight. As the shaft hole 161 in the sleeve 163 only provides for the connection with the spindle 35, and the spindle 35 is a passive element, length of the support bracket 16 can be decreased without affecting its strength.

Accordingly, when the rotating window 30 of present invention rotates, a larger angle in the line of sight can be provided, and balance and stability of rotation are better, such that when the transparent window 34 rotates eccentrically, it will be stopped immediately, thereby improving safety of usage.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A rotating window comprising:
a base member, which is provided with a circular groove, with a support bracket being connected between inner walls of the circular groove, a center of the support bracket being provided with a sleeve having a shaft hole, and an exterior side of the support bracket being a hollow area; and coil seats, which are wound by a plurality of metallic coils and are fixedly connected in an interior of a magneto-conductive element, with the magneto-conductive element being fixedly connected into the circular groove; the rotating window being loosely connected into the circular groove to form a motor stator and being constituted by (a) a turntable, a center of which is provided with a through-hole, and an inner side of which is provided with a flange, with a transparent window being fixed into and sealing the through-hole; (b) a back iron, which is made by a magneto-conductive material and is sheathed and fixed at a side of a permanent magnet ring, with the magnet ring and the back iron being sheathed together and fixed on a surface of the flange, and then sheathed at an inner side of the base member, thus further forming an air gap between the magnet ring and an inner wall of the magneto-conductive element; and (c) a spindle, which is loosely connected into the shaft hole, with a shaft end being fixed in a center of the rotating window; the base member being fixed on an inner surface of a static transparent board; the magneto-conductive element forming a motor stator to result in an electro-magnetic field to drive the magnet ring to rotate, with the rotating window rotating along with the magnet ring simultaneously to sling off any liquid or debris which sprays on a surface of the transparent window.

2. The rotating window according to claim 1, wherein the base member and the rotating window are assembled into an electric motor device.

3. The rotating window according to claim 1, wherein the shaft end is sheathed into an inner gasket, such that the inner gasket is tightly fitted with the shaft end; a center of the transparent window being provided with a through-hole, the inner gasket being fitted into the through-hole of said window and tightly attached on a surface at a rim of the through-hole of said window; an outer gasket being transfixed into the shaft end and tightly attached on an outer surface of the through-hole of said window, with the inner gasket and the outer gasket being screwed and fixed together; an outer cap being screwed into the shaft end to cover the outer gasket, and the transparent window being clipped and fixed by the inner gasket and the outer gasket.

4. The rotating window according to claim 1, wherein the shaft hole is fixed with a bearing, and the spindle is fixed in a shaft hole of the bearing.

5. The rotating window according to claim 1, wherein two pieces of circuit boards are fixed respectively into the circular groove, with a board surface of one arc-shape circuit board being protruded with a sensor switch; a covering element being provided with an arc-shape groove and fixed on the base member to seal a side of the circular groove, whereas the sensor switch being exposed in the arc-shape groove.

6. The rotating window according to claim 1, wherein the base member is screwed and fixed on an inner surface of the static transparent board; corresponding to an outer surface of the transparent board, an outer cap being fixed by attaching an adhesive disc, and the outer cap being formed with an arc-shape groove to correspond with an arc-shape groove of a covering element; a magnetic block being loosely connected and locked into the arc-shape groove and being dislocated in the arc-shape groove upon being subjected to force; when the magnetic block approaching to the sensor switch, a sensor switch being in a close-circuit state (on), to actuate a driving circuit of the circuit board, whereas when the magnetic block leaving the sensor switch, the sensor switch being in an open-circuit state (off) to shut off the driving circuit of the circuit board.

7. The rotating window according to claim 1, wherein the magneto-conductive element is made by a silicon-steel piece into an arc-shape body, an outer surface of which is screwed and fixed with a gasket to stably fix the coil seats on the magneto-conductive element.

8. The rotating window according to claim 1, wherein the support bracket is arranged as a letter of I, and is aligned longitudinally or transversally.

9. The rotating window according to claim 1, wherein the support bracket is extended and connected to the sleeve only, thereby forming a non-continuous state.

10. The rotating window according to claim 1, wherein loosely-connected ends at sides of the base member are provided respectively with projected rings and concaved rings, loosely-connected ends at exterior sides of the turntable are provided respectively with projected rings and concaved rings, the projected rings are correspondingly fitted into the concaved rings of the base member, and the concaved rings are correspondingly fitted with the projected rings of the base member, thereby forming a maze design to prevent from water leakage.

11. The rotating window according to claim 1, wherein when the rotating window rotates eccentrically, local air disappears, and the magnet ring is absorbed magnetically to the inner wall of magneto-conductive element, thereby stopping the rotating window.

12. The rotating window according to claim 1, wherein an outer connection end of the shaft hole is fixedly connected with a sealing cap to seal the shaft hole.

13. The rotating window according to claim 1, wherein a connection end of the base member is connected with a connection seat for connecting an external connector and wires.

14. The rotating window according to claim 1, wherein a side of the circular groove of the base member is sealed by a covering element; an adhesive disc being affixed on the covering element again; a set of bolts being screwed into preset screw-holes of the static transparent board, the adhesive disc, the covering element, and the base member, such that the base member is fixed at an inner surface of the static transparent board.

* * * * *